(12) United States Patent
Sarkar et al.

(10) Patent No.: US 11,227,528 B2
(45) Date of Patent: Jan. 18, 2022

(54) SETTING WHITE POINT BASED ON DISPLAY TEMPERATURE

(71) Applicant: Microsoft Technology Licensing, LLC, Redmond, WA (US)

(72) Inventors: Abhijit Sarkar, Woodinville, WA (US); Dmitry Reshidko, Sammamish, WA (US); Tuomas Heikki Sakari Vallius, Espoo (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/888,043

(22) Filed: May 29, 2020

(65) Prior Publication Data

US 2021/0375179 A1 Dec. 2, 2021

(51) Int. Cl.
*H04N 9/73* (2006.01)
*G09G 3/20* (2006.01)
*G09G 3/32* (2016.01)
*G02B 27/01* (2006.01)

(52) U.S. Cl.
CPC ....... *G09G 3/2003* (2013.01); *G02B 27/0172* (2013.01); *G09G 3/32* (2013.01); *G02B 2027/0112* (2013.01); *G09G 2320/0666* (2013.01); *G09G 2360/147* (2013.01)

(58) Field of Classification Search
CPC ... G06T 11/001; G06T 7/90; H04N 21/42204; H04N 7/147; H04N 9/73; H04N 9/77; G01J 1/0492; G01J 1/4204; G01J 1/4228; G01J 2001/4247; G01J 2001/4252; G01J 2003/467; G01J 3/0264; G01J 3/0272; G01J 3/0278; G01J 3/462; G01J 3/465;
(Continued)

(56) References Cited

U.S. PATENT DOCUMENTS 7,675,249 B2 * 3/2010 Furukawa ............ G09G 3/3413
315/309
8,405,674 B2 * 3/2013 Sakai ................... G01J 1/4204
345/593
(Continued)

OTHER PUBLICATIONS

"How are LEDs Affected by Heat?", Retrieved from: https://www.lrc.rpi.edu/programs/nlpip/lightinganswers/led/heat.asp, May 2003, 01 Page.
(Continued)

*Primary Examiner* — Ram A Mistry
(74) *Attorney, Agent, or Firm* — Alleman Hall Creasman & Tuttle LLP (57) ABSTRACT

A method for setting a display white point comprises displaying images with a display including at least a first light source and a second light source. The first light source is configured to emit light having a first color and having a first temperature-dependent luminance change. The second light source is configured to emit light having a second color and having a second temperature-dependent luminance change. An internal display temperature is measured. Based on the internal display temperature being a first temperature, a first target white point is set to prioritize color accuracy. Based on the internal display temperature being a second temperature, greater than the first temperature, a second target white point is set to prioritize luminance output.

19 Claims, 5 Drawing Sheets

(58) Field of Classification Search
CPC .... G01J 3/50; G01J 3/505; G01J 3/513; G01J 3/524
See application file for complete search history.

(56) References Cited

U.S. PATENT DOCUMENTS

| | | | |
|---|---|---|---|
| 2007/0115228 A1* | 5/2007 | Roberts | H05B 45/00 345/82 |
| 2007/0195025 A1 | 8/2007 | Korcharz et al. | |
| 2009/0096724 A1 | 4/2009 | Ichikawa et al. | |
| 2010/0091039 A1* | 4/2010 | Marcu | G09G 5/06 345/690 |
| 2010/0091050 A1* | 4/2010 | El-Ghoroury | H04N 9/3155 345/691 |
| 2013/0076799 A1 | 3/2013 | Wurzel et al. | |
| 2014/0139570 A1 | 5/2014 | Albrecht et al. | |
| 2017/0118813 A1 | 4/2017 | Matsui | |
| 2019/0072767 A1* | 3/2019 | Vallius | G02B 6/0038 |

OTHER PUBLICATIONS

"International Search Report and Written Opinion Issued in PCT Application No. PCT/US21/025290", dated Jun. 22, 2021, 14 Pages.

* cited by examiner

| DISPLAY TEMP | COLOR TEMP | RED | GREEN | BLUE |
|---|---|---|---|---|
| 25°C | 6500K | 1.0 | 1.0 | 1.0 |
| 50°C | 7000K | 1.0 | 1.35 | 0.95 |
| . . . . . . . . | | | | |

SETTING WHITE POINT BASED ON DISPLAY TEMPERATURE

BACKGROUND

Electronic displays use a "white point" to define how constituent colors, for example red, green, and blue, are balanced to represent the color white. Many electronic displays use a reference white point of 6500K (D65).

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method for setting a display white point comprises displaying images with a display including at least a first light source and a second light source. The first light source is configured to emit light having a first color and having a first temperature-dependent luminance change. The second light source is configured to emit light having a second color and having a second temperature-dependent luminance change. An internal display temperature is measured. Based on the internal display temperature being a first temperature, a first target white point is set to prioritize color accuracy. Based on the internal display temperature being a second temperature, greater than the first temperature, a second target white point is set to prioritize luminance output.

DETAILED DESCRIPTION

Many display devices include multiple different light sources (also referred to as display primaries) corresponding to different specific colors of light, characterized by their spectral composition at different wavelengths. As examples, laser-based and light-emitting diode (LED)-based light sources may include color-specific variants that emit red, green, and blue light with specific spectral composition. In general, the white point for a display may be established by setting peak luminance of various color-specific light sources of the display, relative to the maximum possible luminance output values for each light source. While this disclosure primarily describes red, green, blue (RGB) light source colors, it is to be understood that the disclosed temperature-dependent white balance adjustments may be used with any mix of different light source colors. As described herein, it may be difficult for a display to maintain a desired white point while also maintaining a bright, high-luminance display, because different light sources may dim at different rates in response to increasing temperatures. The present disclosure is directed to systems and methods that dynamically prioritize white point vs. luminance as display temperatures increase. It is believed that this type of dynamic prioritization improves the overall quality of displayed images, thus improving the viewing experience.

Figure 1:
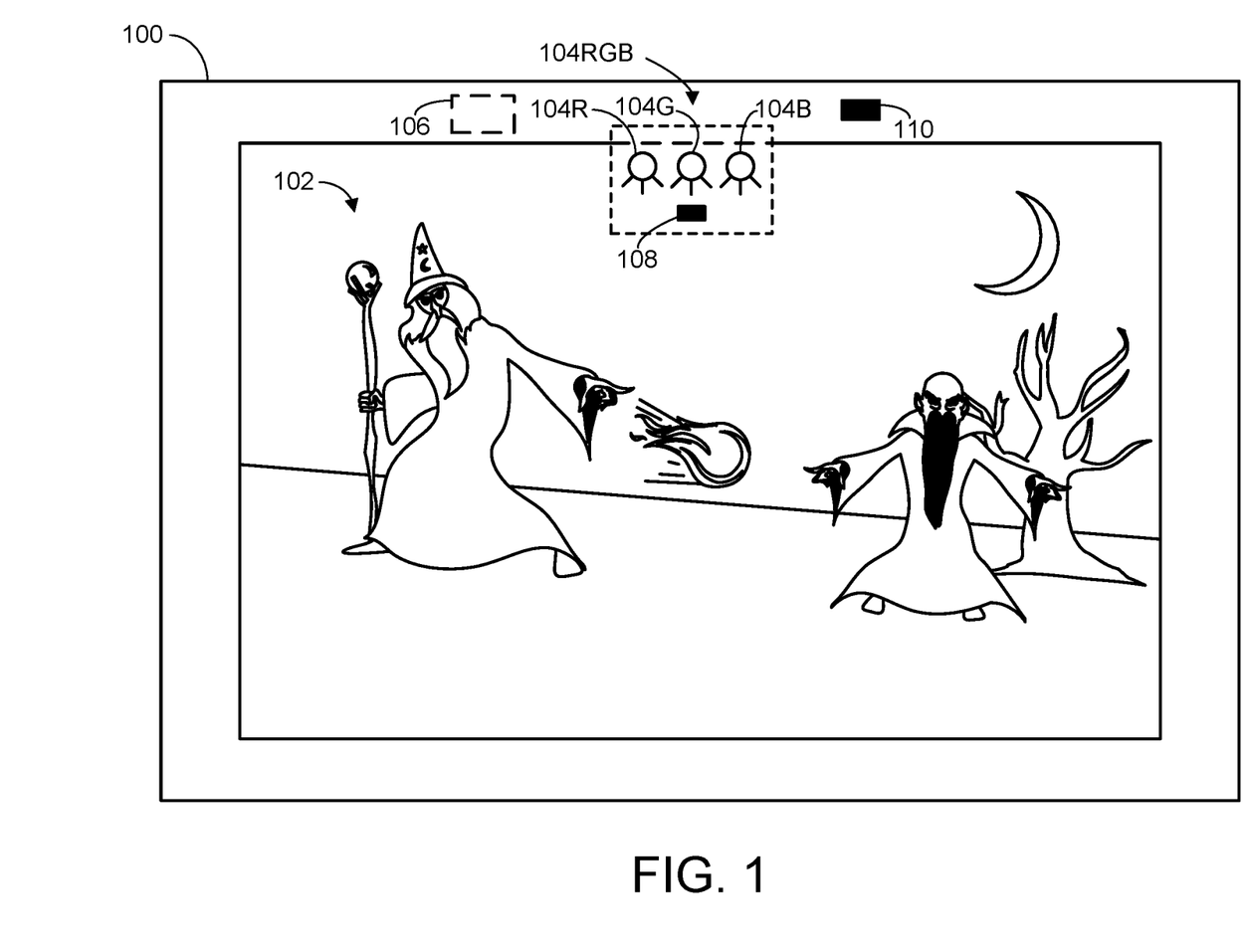
FIG. 1 schematically depicts an example display device.

FIG. 1 schematically illustrates an example display device 100. While shown in the form of a conventional electronic display, it is to be understood that the techniques disclosed herein may be used to control virtually any type of electronic display, and may be highly beneficial in head-mounted displays (HMDs) or other near-eye displays, as discussed further with reference to FIG. 4.

As shown, the display device is displaying an image 102. The image is formed using light emitted by a plurality of light sources 104R, 104B, and 104G (collectively 104RGB). The plurality of light sources 104RGB may correspond to different specific colors of light—e.g., red, green, and blue. The light sources are depicted within a dashed box representing a cutout, to indicate that the light sources are disposed underneath a surface of the display. By controlling the luminance output for each of the plurality of light sources, the display device may be calibrated to use different white points, thereby defining the color white within the display's color space at any given luminance.

Many display devices use light sources that exhibit temperature-dependent luminance output. For example, the light output of laser-based and LED-based light sources at a constant electrical current varies as a function of temperature. As the internal display temperature increases, luminance output may decrease. This phenomenon is typically more pronounced in light sources that produce red and yellow light (e.g., AlGaInP LEDs) as compared to light sources that produce blue, green, or white light (e.g., InGaN LEDs).

This may reduce overall display brightness as internal display temperature increases. However, this type of decrease in brightness may be undesirable in various situations, such as when the external ambient light is relatively bright. Furthermore, when the reduction in luminance output at higher temperatures is significant, it may be physically impossible for the display to simultaneously achieve a neutral white point (e.g., D65) and a minimum desired brightness, even if the display could be recalibrated to account for the higher temperature.

Figure 2:
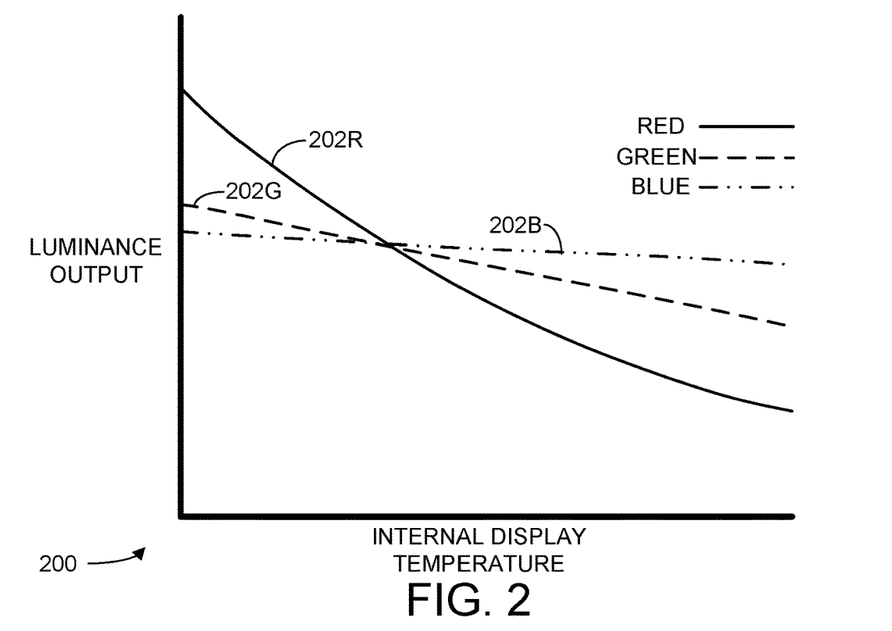
FIG. 2 illustrates temperature-dependent luminance change for light sources of a display.

This is illustrated in FIG. 2, which shows an example plot 200 depicting temperature-dependent luminance change for different light sources of a display device. As shown, a first light source configured to emit a first color of light (e.g., red) has a first temperature-dependent luminance change 202R. In other words, as the internal display temperature increases, the luminance output of the light source decreases. Similarly, a second light source configured to emit a second color of light (e.g., green) has a second temperature-dependent luminance change that differs from the first temperature-dependent luminance change 202G. Specifically, the first temperature-dependent luminance change causes a greater loss of luminance output for the first light source than the second temperature-dependent luminance change causes for the second light source as the internal display temperature increases.

Plot 200 also depicts a third temperature-dependent luminance change 202B for a third light source of a display configured to emit a third color (e.g., blue). The displays described herein may have any suitable number of different light sources, each configured to emit any suitable colors of light. In general, any or all of the light sources of the display may have differing temperature-dependent luminance behaviors, and this can make it difficult or impossible for the display to maintain a neutral white point as internal display temperature increases.

Accordingly, the present disclosure is directed to techniques for dynamically setting the target white point for a display device based at least on the internal display temperature(s) that affect luminance change (e.g., the attenuation or dimming of a light source as the temperature of the light source increases). At a first internal display temperature, the display device may use a first target white point that prioritizes color accuracy —e.g., a standard neutral white point such as D65. As the internal display temperature(s) increase—e.g., due to heat received from a surrounding environment or produced via device operation —light sources of the display may exhibit temperature-dependent luminance change. This may compromise the ability of the display to maintain the first target white point. Thus, at a second internal display temperature, the display may use a second target white point that prioritizes luminance output rather than color accuracy. In other words, the display may be configured to shift the white point from a Planckian locus in order to increase overall brightness compared to the brightness that could be achieved if the white point were maintained at the Planckian locus. For example, the display may prioritize luminance output for a color-specific light source that exhibits the greatest temperature-dependent luminance change. In this manner, the overall optical efficiency of the display may be increased at relatively high operating temperatures.

Figure 3:
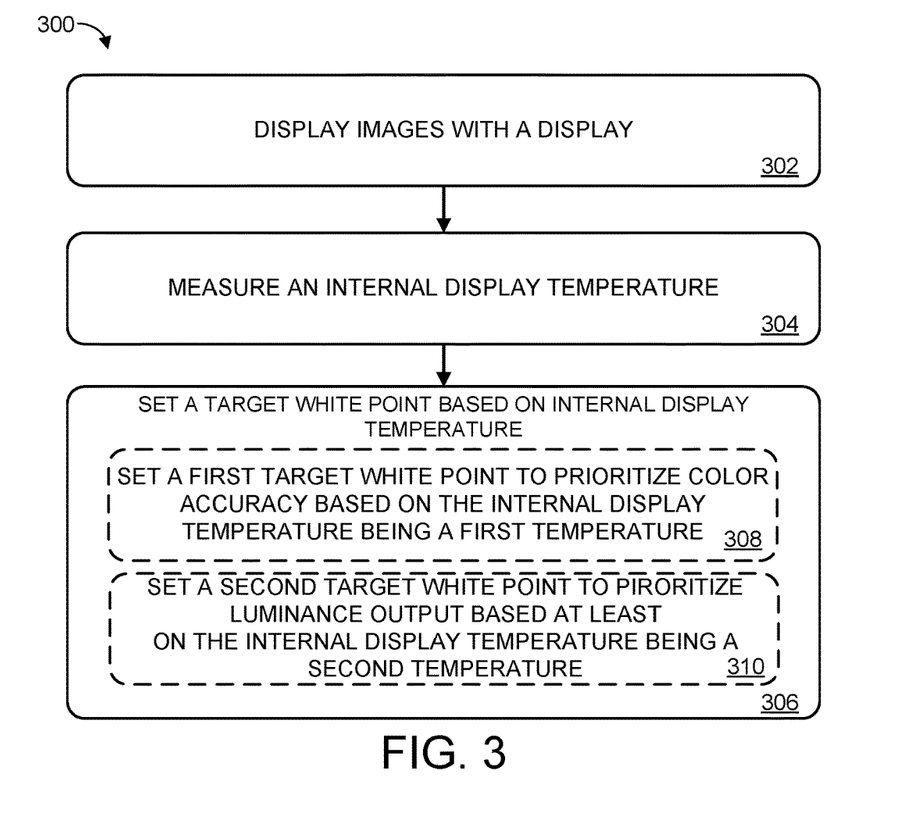
FIG. 3 shows an example method for setting a display white point.
Figure 4:
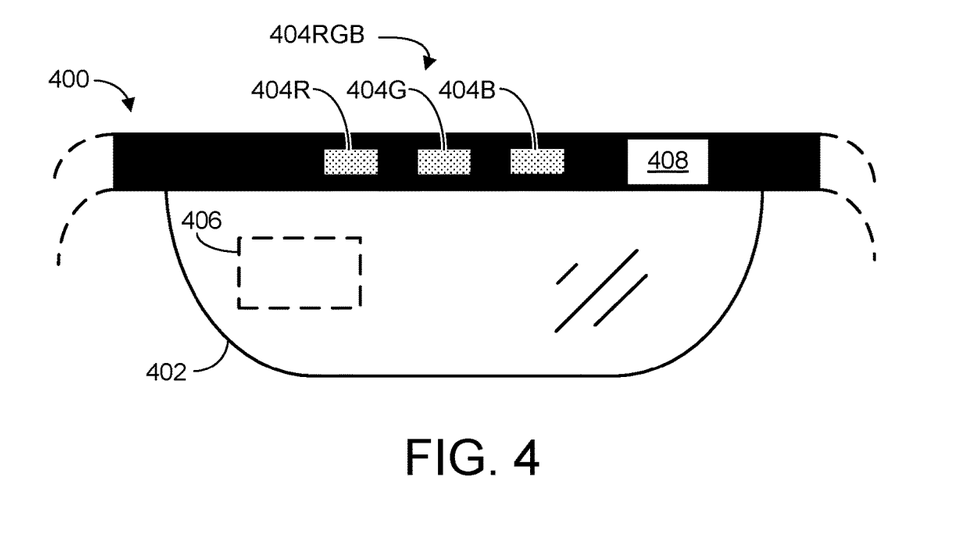
FIG. 4 schematically depicts an example near-eye display device including a near-eye display.

FIG. 3 illustrates an example method 300 for setting a display white point. Method 300 may be implemented with any suitable display device, utilizing any suitable display technology, as well as any suitable number of color-specific light sources. Steps of method 300 may be performed by any suitable processing or logic componentry of a display device, or other computing device configured to control a display. In the example of FIG. 1, steps of method 300 may be performed by a display controller 106 of the display device, which may control light sources 104RGB to form images on the display. In the example of FIG. 4, steps of method 300 may be performed by a controller 408 of the near-eye display, which may control light sources 404RGB to form images in an eyebox via a near-eye optic. The display of method 300 may be used with, or integrated into, any computing device having any suitable form factor and hardware configuration. In some examples, method 300 may be implemented by computing system 800 described below with respect to FIG. 8.

At 302, method 300 includes displaying images with a display. As discussed above, this is schematically illustrated with respect to FIG. 1, in which example display device 100 presents an image 102 using a plurality of light sources 104RGB. The display device of FIG. 1 is schematic in nature and presented as a non-limiting example. Display device 100 is depicted as having a flat and rectangular form factor, similar to a television, computer monitor, tablet computer, smartphone, portable video game console, etc. It will be understood, however, that the techniques described herein may be applied to other displays having other shapes, sizes, and form factors.

For example, the display may be a near-eye optic of a near-eye display device (HMD). This is schematically illustrated in FIG. 4, which shows an example near-eye display device 400 including a near-eye optic 402. As with display 100, near-eye display device 400 includes light sources 404R, 404G, and 404B (collectively, 404RGB) configured to emit light. The light sources may in some cases be configured to emit different colors of light, and may exhibit different temperature-dependent luminance behaviors. Near-eye display device 400 may therefore display images by directing emitted light having different colors (e.g., RGB) to an eyebox 406 via near-eye optic 402 of the near-eye display device. Near-eye display device also includes a display controller 408 configured to control the light sources 404RGB to form images at the eyebox.

In any case, the displays described herein may form images in any suitable way. The displays may be reflective, transmissive, and/or scanning. In some cases, displays may use an emissive display technology, in which each pixel of the display corresponds to one or more individual light sources (e.g., organic light emitting display (OLED)). Each light source may be dynamically controllable to emit the light contributing to its corresponding pixel. Alternatively, the display may use a transmissive display technology, in which the light sources collectively generate a backlight that is transmitted through a suitable medium (e.g., transmissive liquid crystal display (LED)). The medium may be dynamically controllable to change the color of the backlight as it passes through the medium at various points (e.g., color filters within display sub-pixels), thereby forming an image from a plurality of pixels. In some examples, the displays may take the form of a microdisplay.

Returning to FIG. 1, three light sources 104RGB are schematically shown. However, it will be understood that the displays described herein may include any suitable number of light sources, each configured to emit any suitable colors of light. In some cases, a display may include multiple light sources each configured to emit the same color of light —e.g., two or more light sources may each emit the same or different wavelengths of green light. Furthermore, a "light source" as used herein may refer to any suitable technology that may be used within a display to produce image light— e.g., laser-based or LED-based light sources.

Returning to FIG. 3, at 304, method 300 includes measuring an internal display temperature of the display. This may be done via one or more internal temperature sensor(s) 108 of the display. As one example, a temperature sensor may be a thermocouple sensor. The internal temperature(s) of the display may be measured with any suitable frequency. In some cases, the display device may include multiple temperature sensors, configured to measure the internal temperatures at multiple locations within the display. For example, one temperature sensor may measure a first internal display temperature local to a first light source (e.g., a red laser), while another temperature sensor measures a second internal display temperature local to a second light source (e.g., a green laser). In this way, if different light sources have different local temperatures compared to one another, the white balance adjustments may be tuned to account for these differences.

At 306, method 300 includes setting a target white point for the display based on the measured internal temperature(s). In general, a wide range of white points may be achieved by assigning to each light source different peak luminance targets, which will typically be less than that light source's maximum possible luminance. These peak luminance target values may be defined or calculated during display calibration, and will depend on the desired target white point as well as the unique characteristics of the specific display in question.

In some cases, as will be described in more detail below, the target white point for a display may further be set as a function of the external ambient brightness. Thus, display 100 may also include an ambient light sensor 110, configured to measure a brightness of the external ambient light in the surrounding environment of display device 100. Though only one ambient light sensor is shown in FIG. 1, any suitable number of ambient light sensors may be used.

As discussed above, temperature-dependent luminance change of one or more light sources of a display may reduce the overall luminance output of the display as internal temperature(s) increase. This may be alleviated by setting a new target white point that prioritizes luminance output, as will be described in more detail below. Alternatively, however, it may be desirable in some situations to maintain a target white point that prioritizes color accuracy, even if it results in a loss of luminance output. For example, when the external ambient light is relatively dim, a loss in luminance output may not significantly impact the user experience. Thus, in some examples, the target white point for a display may be defined as a function of multiple input variables—e.g., one or more internal temperature values local to different light sources, and/or external ambient brightness. In such cases, the controller may only shift the white point when both 1) ambient light is above a threshold level, and 2) internal temperature(s) are above a threshold level.

In some examples, setting of a target white point may depend on one or more internal temperature values, in addition to the relative characteristics of the specific white sources within the display. Thus, the white point target may in some cases be defined on a per-device basis (e.g., during factory calibration), in which case the target white point for any particular internal temperature may vary from device to device. Alternatively, the device may use a predefined value determined based on other displays having similar hardware configurations (e.g., other displays of the same product line).

At 308, method 300 optionally includes setting a first target white point to prioritize color accuracy based on the internal display temperature(s) being a first temperature. In one example, the first target white point may be a standard, neutral white point such as D65, and the first temperature(s) may correspond to a nominal device operating temperature—e.g., 25° C.—in which none of the light sources demonstrate significant temperature-dependent luminance change. However, any suitable white point may be used, corresponding to any desired color temperature. In general, the first temperature may be set to a highest temperature at which the temperature-dependent luminance changes of the light sources do not prevent the display from achieving the first target white point.

At 310, method 300 optionally includes setting a second target white point to prioritize luminance output based on the internal display temperature(s) being a second temperature, greater than the first temperature. In some examples, the second white point may be set to specifically prioritize luminance output for a light source that exhibits the greatest temperature-dependent luminance change at the second temperature. For example, in the case where red-specific light sources exhibit a greater temperature-dependent luminance change than other color-specific light sources, the second target white point may be set to prioritize red luminance output. In other words, the red light source may be adjusted for maximum brightness, and the other light sources may be adjusted around red to achieve the desired white point.

The second internal display temperature may be any suitable temperature value. Typically, as the internal temperature(s) of the display rise, there will be some temperature at which temperature-dependent luminance change of one or more color-specific light sources begins to interfere with the ability of the display to maintain the first target white point. Thus, the display device may set a threshold temperature at which the target white point is switched from the first target to the second target, and the second internal display temperature may be any value at or above this threshold.

Notably, the temperature-dependent luminance characteristics of any particular display will vary depending on that display's specific configuration, and therefore the temperature threshold for any particular display will vary. In some cases, the display device may use more than two different target white points depending on the current internal display temperature(s), in which case there will be more than one threshold. Alternatively, the target white point for any particular internal display temperature(s) may be calculated on-the-fly.

As with the first target white point, the second target white point may be any suitable value. The second target white point may optionally be a non-standard white point that diverges from a Planckian locus. In general, the second target white point will be any value that allows for more total luminance output than the first target white point, given the current internal display temperature(s) and the temperature-dependent luminance behaviors of the display's light sources.

In an extreme case, each of the light sources of the display could simply be set to their maximum output, thereby achieving the highest possible luminance output for the display. However, this would most likely result in an unsatisfactory color accuracy for images presented on the display. Thus, the second target white point may be set to achieve a compromise between color accuracy and luminance output; improving over the luminance output of the first target white point while still maintaining an acceptable level of color accuracy. The specific value used for the second target white point will vary depending on the capabilities of the specific display device in question, as different display technologies and light source types will exhibit different temperature-dependent luminance behaviors.

While 308 and 310 of FIG. 3 describe a discrete step function with two possible white points, it is to be understood that each of the individual light sources may be adjusted according to any suitable single or multi-variable function for any desired number of different temperature-dependent white points, e.g., a continual function in which each of R, G, & B light sources are adjusted as a function of ambient light and internal R, G, B, temperatures. In this way, as internal temperature(s) increase, color accuracy may gradually be sacrificed in favor of maintaining acceptable luminance.

Figure 5A:
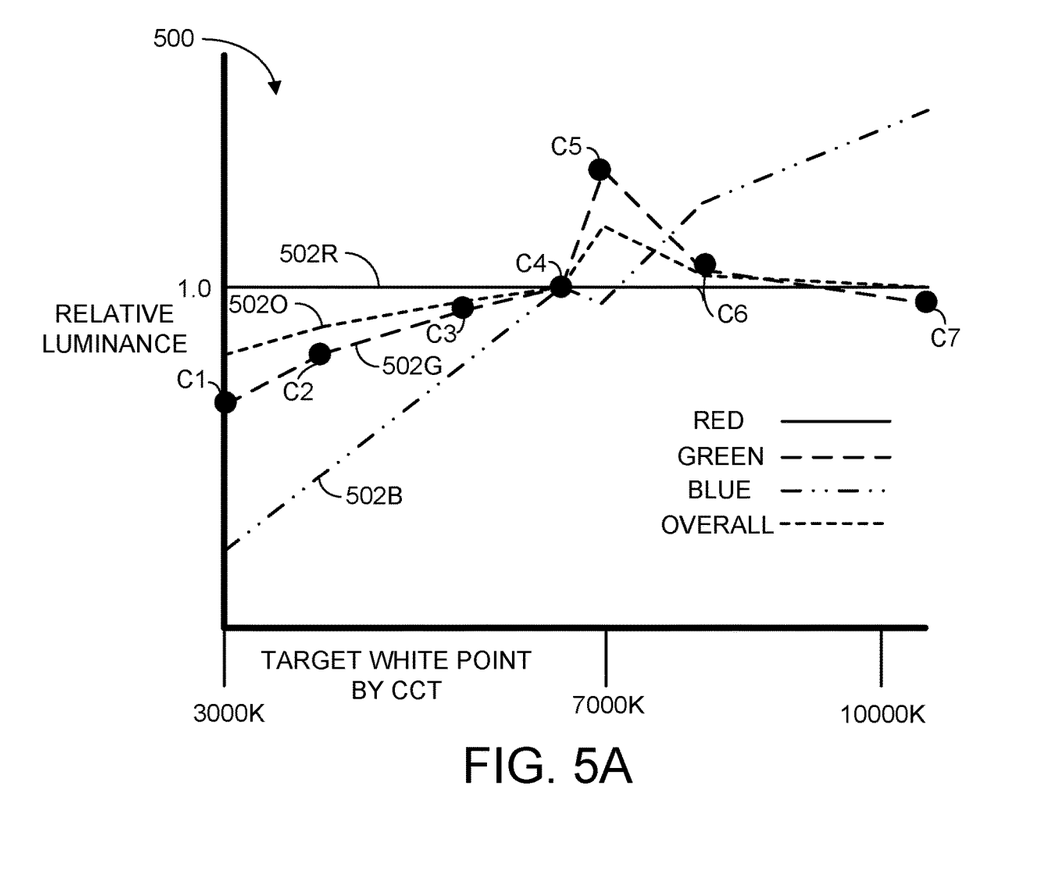
FIG. 5A illustrates relative luminance output for light sources of a display at various color temperature targets.

FIG. 5A depicts a plot 500, which illustrates the luminance output of light sources of an example display device at numerous different target white point values in terms of correlated color temperatures (CCT). Specifically, FIG. 5A illustrates a scenario in which the red light source is maxed to mitigate temperature dependent change.

Plot 500 illustrates the relative luminance output of each of the red (502R), green (502G), and blue (502B) light sources, as well as the overall luminance output (5020) of the display, as the target white point of the display is increased to higher color temperatures. The luminance output values are expressed relative to their D65 values under normal operating conditions—i.e., when the performance of the red light source is not limited.

Figure 5B:
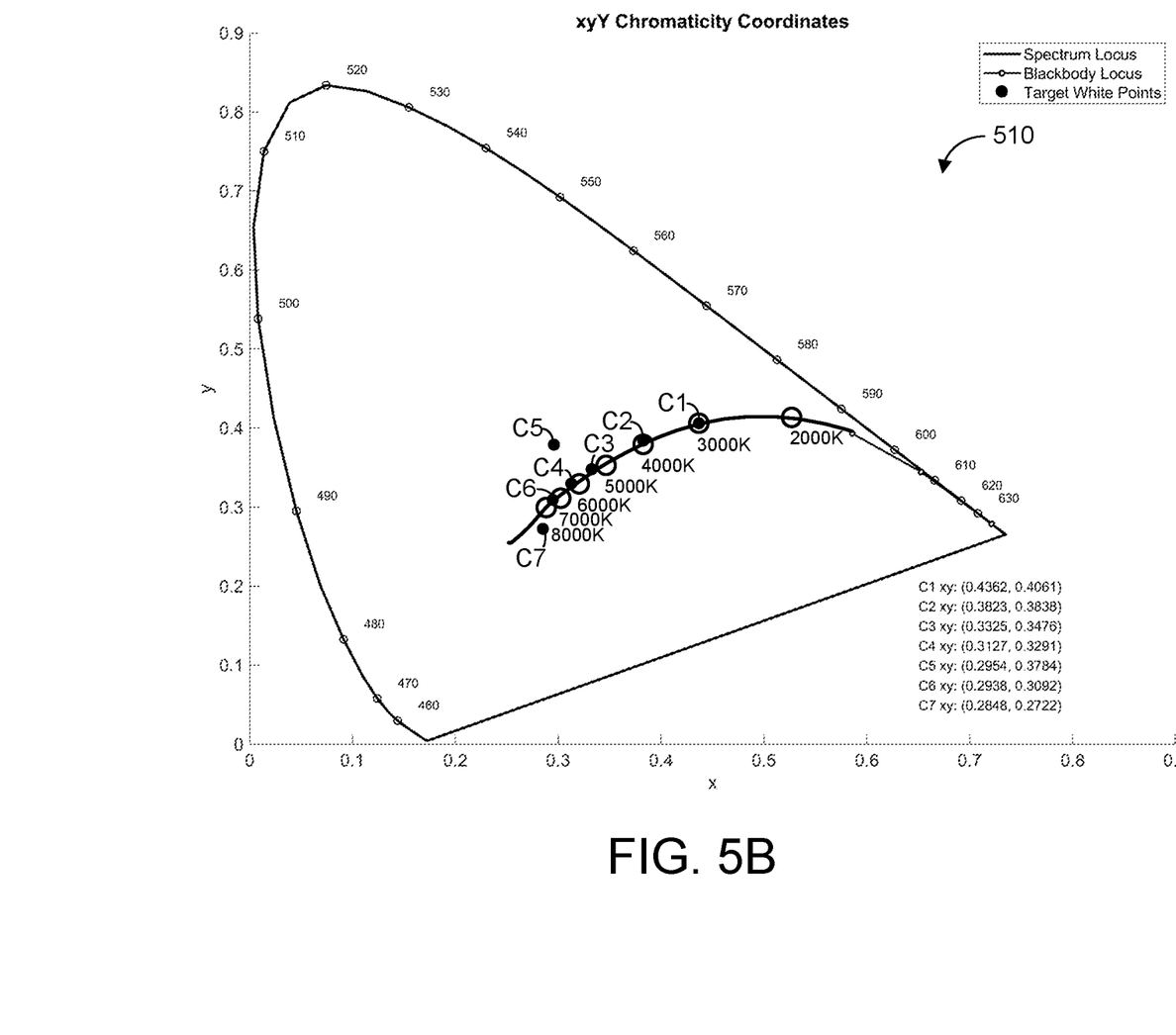
FIG. 5B illustrates an example chromaticity diagram depicting the positions of various color targets relative to the Planckian locus.

FIG. 5B show an example CIE xy chromaticity diagram 510, where the xy color coordinates of monochromatic wavelengths fall on the "horseshoe" shaped spectrum locus. The Planckian (or blackbody) locus is also shown as a curve connecting the color coordinates corresponding to different CCT values (2000K-8000K as labeled here). These points are traditionally used to define target white points in color imaging systems. The points C1 through C7 are various target white points used in plot 500 of FIG. 5A. Notably, target C5 (with xy color coordinates 0.2954, 0.3784) is away from the Planckian locus.

Returning to FIG. 5A, as shown, the luminance output of the green light source, 502G as well as the overall luminance output 502O of the display, exhibit a spike at point C5. Point C5 is a target white point close to 7000K, but away from the Planckian locus (as shown in FIG. 5B). As compared to the luminance output at D65 under the same red-limited conditions, the overall luminance output of the display is approximately 12% higher. Thus, for displays that exhibit similar spectral characteristics and similar temperature-dependent luminance change to the scenario depicted in FIG. 5, chromaticity coordinates depicted by C5 (or similar chromaticity values in close proximity to C5) is a suitable target white point when the red light source is experiencing the corresponding level of temperature dependent change. It will be understood, however, that every display will exhibit different spectral characteristics as well as temperature-dependent luminance change, and thus testing may be performed for other display configurations and operating temperatures to determine suitable target white point(s) for any particular display at any particular internal temperature(s) and/or ambient brightness levels.

As discussed above, the white point of a display may be set by controlling peak luminance values of various light sources of the display, which will typically be less than the maximum luminance output possible for each light source. These peak luminance targets may be applied in any suitable way.

Figure 6:
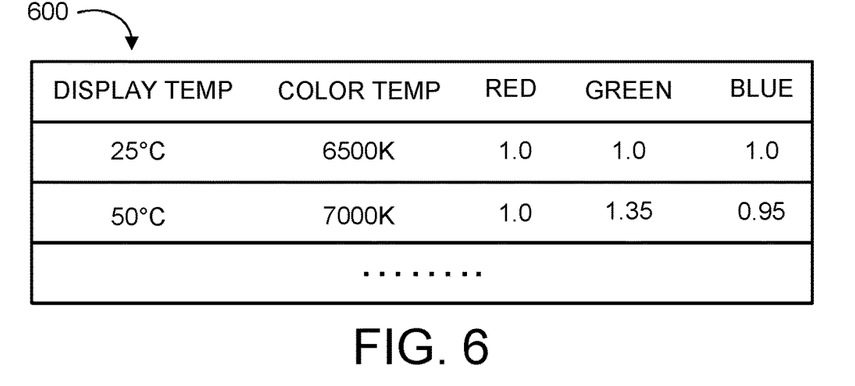
FIG. 6 illustrates an example lookup table usable to set peak luminance targets for light sources of a display.

In one example, the peak luminance targets for light sources of a display may be retrieved from a lookup table. This is illustrated in FIG. 6, which shows an example lookup table 600. Table 600 defines, for various internal display temperatures, a target white point color temperature, as well as peak luminance targets for red, green, and blue light sources of the display. These peak luminance targets are expressed relative to their nominal D65 values, although peak luminance targets may be expressed in other suitable ways—e.g., as absolute luminance values measured in nits, or as fractions of each light source's maximum luminance output.

Table 600 is deliberately simplified and presented only for illustrative purposes. In practical applications, a similar lookup table may define any number of different target white points, for any number of different internal display temperatures. In some cases, a lookup-table may use more than just internal display temperature as an input. For example, inputs to a lookup table may include any or all of a current internal display temperature, maximum luminance output values for one or more light sources, peak wavelength values for one or more light sources, and/or ambient brightness.

Additionally, or alternatively, peak luminance targets for light sources of a display may be a function of internal display temperature(s) and/or ambient brightness, and the display controller may use such a function to adjust the different light sources to achieve different temperature-dependent white points. This is schematically illustrated with respect to FIG. 7, which schematically illustrates calculating peak luminance targets 704R, 704G, and 704B for red, green, and blue light sources, as a function 702 of an internal temperature 700 of a display.

Figure 7:
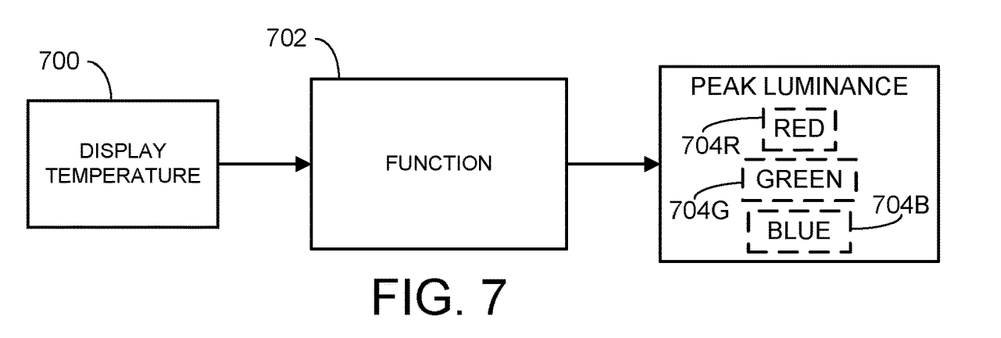
FIG. 7 schematically illustrates calculation of peak luminance targets based on internal display temperature.

As with table 600, function 700 may receive other inputs in addition to, or as an alternative to the internal display temperature. For example, the peak luminance targets may in some cases be set according to a function of the external ambient display brightness, the maximum luminance output for one or more light sources, the peak wavelength for one or more light sources, etc.

One example function for setting peak luminance targets is provided below, in a simplified pseudo-code form using Matlab® coding convention. The below pseudo-code assumes that D65 is used as the white point target, and that the display uses three light sources (referred to as display primaries). However, any suitable white point target and light source technology may be used. The white point target is expressed by X, Y, and Z tristimulus values. Notably, corresponding (x, y) color coordinates can be obtained as follows: $x=X/(X+Y+Z)$; and $y=Y/(X+Y+Z)$. (x, y) values in turn can be converted to a number equivalent to a specific CCT. The Y value represents luminance (as $cd/m^2$ or nits).

In the CIE colorimetric system, any color is uniquely identified by three decimal numbers, commonly referred to as tristimulus values, and denoted as XYZ. The following is a description of different variables used in the pseudo code and their content (note: in the pseudo code, indices of an array starts from 1, not 0):

XYZdisplayRGB: XYZ values of each of the display primaries, red, green and blue (described henceforth as RGB). Also known as a primary tristimulus matrix. This is a 3×3 matrix of 9 decimal numbers, where the $1^{st}$, $2^{nd}$ and $3^{rd}$ rows include X, Y and Z values respectively, and $1^{st}$, $2^{nd}$ and $3^{rd}$ columns represent red, green and blue respectively.

XYZdisplayW: XYZ values of white. This is a [3×1] vector of 3 decimal numbers, where the $1^{st}$, $2^{nd}$ and $3^{rd}$ rows include X, Y and Z values respectively. Note: x, y color coordinates are obtained as:

$$x=X/(X+Y+Z); y=Y/(X+Y+Z)$$

XYZdisplayRGB_norm: Normalized primary tristimulus matrix, obtained by dividing XYZdisplayRGB by Y of XYZdisplayW [given by XYZdisplayW(2)].

XYZ_Target: XYZ values of target white point. This is a [3×1] vector of 3 decimal numbers, following the same convention described above.

sf: Scale factors for red, green and blue to achieve the target white point without considering luminance target. Peak luminance of RGB primaries are attenuated by these scale factors. This is a [3×1] vector of 3 decimal numbers. A matrix multiplication of [3×3] normalized primary tristimulus matrix and the [3×1] scale factors gives the [3×1] XYZ values of the target white point.

projXYZdisplayRGB: Predicted XYZ values of the R,G,B display primaries, after adjusting the peak RGB luminance by the scale factors. This is a 3×3 matrix of 9 decimal numbers, following the same convention described above.

projXYZdisplayW: Predicted XYZ values of the display white, after adjusting the peak RGB luminance by the scale factors.

whiteBalLumTarget: Target luminance (in nits) of display white post adjustment.

lumScaleFactor: A fractional number representing the factor by which the luminance (Y) value of the predicted display white must be adjusted to achieve the target luminance.

sfFinal: Final scale factors for red, green and blue to achieve both white point and luminance targets. This is a [3×1] vector of 3 decimal numbers.

% Step 1: normalize XYZ of RGB display primaries by white Y (XYZdisplayW)
% XYZdisplayW is sum of RGB Y (Y is luminance)
XYZdisplayRGB_norm=XYZdisplayRGB/XYZdisplayW (2);
% Step 2: normalize XYZ for D65 as target
% For D65, XYZ_Target=[0.95047, 1, 1.0888]'
XYZ_Target=[0.95047, 1, 1.0888] ';
% Step 3: initial XYZ scale factors % solve for sf:
XYZdisplayRGB_norm*sf=XYZ_Target
sf=XYZdisplayRGB_norm\XYZ_Target;
% Step 4: Compute initial corrected XYZ after applying above scale factors
% projXYZdisplayRGB is 3×3 matrix, which when multiplied by [1 1 1] gives XYZ values of white
% repmat here creates 3 identical rows of the transposed sf vector
projXYZdisplayRGB=XYZdisplayRGB.*repmat(sf, 3, 1);
projXYZdisplayW=projXYZdisplayRGB*[1 1 1]';
% Step 5: Compute luminance scale factor to hit target luminance, can be >1
% initial resultant luminance=projXYZdisplayW(2)
lumScaleFactor=whiteBalLumTarget/projXYZdisplayW (2);
% Step 6: update scale factors to achieve target white point and luminance sfFinal=sf*lumScaleFactor;

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 8:
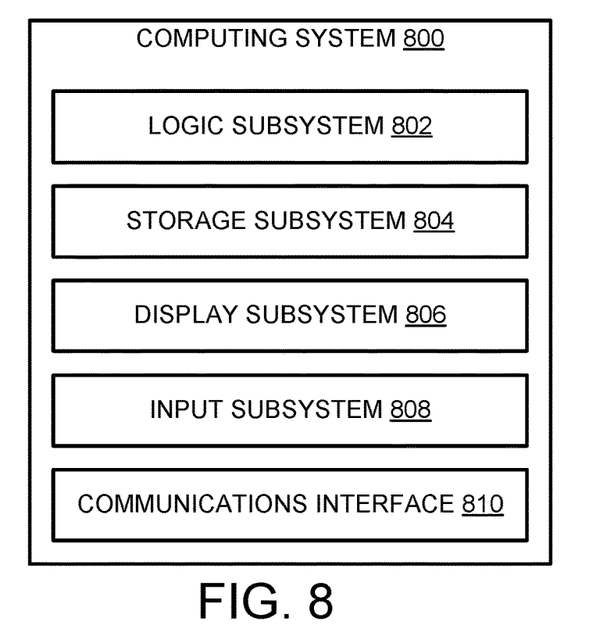
FIG. 8 schematically shows an example computing system.

FIG. 8 schematically shows a simplified representation of a computing system 800 configured to provide any or all of the compute functionality described herein. Computing system 800 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices.

Computing system 800 includes a logic subsystem 802 and a storage subsystem 804. Computing system 800 may optionally include a display subsystem 806, input subsystem 808, communication subsystem 810, and/or other subsystems not shown in FIG. 8.

Logic subsystem 802 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 804 includes one or more physical devices configured to temporarily and/or permanently hold computer information such as data and instructions executable by the logic subsystem. When the storage subsystem includes two or more devices, the devices may be collocated and/or remotely located. Storage subsystem 804 may include volatile, nonvolatile, dynamic, static, read/write, read-only, random-access, sequential-access, location-addressable, file-addressable, and/or content-addressable devices. Storage subsystem 804 may include removable and/or built-in devices. When the logic subsystem executes instructions, the state of storage subsystem 804 may be transformed—e.g., to hold different data.

Aspects of logic subsystem 802 and storage subsystem 804 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

When included, display subsystem 806 may be used to present a visual representation of data held by storage subsystem 804. This visual representation may take the form of a graphical user interface (GUI). Display subsystem 806 may include one or more display devices utilizing virtually any type of technology. In some implementations, display subsystem may include one or more virtual-, augmented-, or mixed reality displays.

When included, input subsystem 808 may comprise of or interface with one or more input devices. An input device may include a sensor device, such as a temperature sensor or ambient brightness sensor, or a user input device. Examples of user input devices include a keyboard, mouse, touch screen, or game controller. In some embodiments, the input subsystem may comprise of or interface with selected natural user input (NUI) componentry. Such componentry may be integrated or peripheral, and the transduction and/or processing of input actions may be handled on-or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 810 may be configured to communicatively couple computing system 800 with one or more other computing devices. Communication subsystem 810 may include wired and/or wireless communication devices compatible with one or more different communication protocols. The communication subsystem may be configured for communication via personal-, local- and/or wide-area networks.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, a method for setting a display white point comprises: displaying images with a display including at least a first light source and a second light source, the first light source configured to emit light having a first color and having a first temperature-dependent luminance change, the second light source configured to emit light having a second color and having a second temperature-dependent luminance change; measuring an internal display temperature; setting a first target white point of images displayed using the first and second light sources to prioritize color accuracy based on the internal display temperature being a first temperature; and setting a second target white point of images displayed using the first and second light sources to prioritize luminance output based at least on the internal display temperature being a second temperature, greater than the first temperature. In this example or any other example, the first temperature-dependent luminance change causes a greater loss of luminance output for the first light source than the second temperature-dependent luminance change causes for the second light source as the internal display temperature increases. In this example or any other example, the second target white point prioritizes luminance output for the first light source. In this example or any other example, the first light source includes an AlGaInP LED and the second light source includes an InGaN LED. In this example or any other example, the display further includes a third light source configured to emit light having a third color and having a third temperature-dependent luminance change. In this example or any other example, the first, second, and third colors include red, green, and blue. In this example or any other example, setting the second target white point includes setting peak luminance targets for the first light source and the second light source. In this example or any other example, the peak luminance targets for the first light source and the second light source are retrieved from a lookup table. In this example or any other example, the peak luminance targets for the first light source and the second light source are set according to a function of the second temperature. In this example or any other example, the method further comprises measuring an external ambient light, where the second target white point is set according to a function of the external ambient light. In this example or any other example, the internal display temperature is a first internal display temperature local to the first light source, and the method further comprises measuring a second internal display temperature local to the second light source. In this example or any other example, the first target white point is a color temperature of 6500K (D65). In this example or any other example, the second target white point is a color temperature that diverges from a Planckian locus. In this example or any other example, the first light source and the second light source are lasers. In this example or any other example, displaying images with the display includes directing the emitted light having the first color and the emitted light having the second color to an eyebox via a near-eye optic of a near-eye display device.

In an example, a display comprises: a first light source configured to emit light having a first color and having a first temperature-dependent luminance change; a second light source configured to emit light having a second color and having a second temperature-dependent luminance change; a temperature-measuring device configured to measure an internal display temperature at one or both of the first light source and the second light source; and a display controller configured to: set a first target white point of images displayed using the first and second light sources to prioritize color accuracy based on the internal display temperature being a first temperature; and set a second target white point of images displayed using the first and second light sources to prioritize luminance output based at least on the internal display temperature being a second temperature, greater than the first temperature. In this example or any other example, the first temperature-dependent luminance change causes a greater loss of luminance output for the first light source than the second temperature-dependent luminance change causes for the second light source as the internal display temperature increases, and the second target white point prioritizes luminance output for the first light source. In this example or any other example, the display further comprises a third light source configured to emit light having a third color and having a third temperature-dependent luminance change, where the first, second, and third colors include red, green, and blue. In this example or any other example, the second target white point is a color temperature that diverges from a Planckian locus.

In an example, a near-eye display comprises: a red light source having a red temperature-dependent luminance change; a green light source having a green temperature-dependent luminance change less than the red temperature-dependent luminance change; a blue light source having a blue temperature-dependent luminance change less than the red temperature-dependent luminance change; a temperature-measuring device configured to measure a temperature of the red light source; and a display controller configured to: set a first target white point of images displayed using the red, green, and blue light sources to prioritize color accuracy based on the temperature of the red light source being a first temperature; and set a second target white point of images displayed using the red, green, and blue light sources to prioritize luminance output of the red light source based at least on the temperature of the red light source being a second temperature, greater than the first temperature.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for setting a display white point, the method comprising:
   displaying images with a display including at least a first light source and a second light source, the first light source configured to emit light having a first color and having a first temperature-dependent luminance change, the second light source configured to emit light having a second color and having a second temperature-dependent luminance change;
   measuring a temperature of the first light source;
   setting a first target white point of images displayed using the first and second light sources to prioritize color accuracy based on the temperature of the first light source being a first temperature; and
   setting a second target white point of images displayed using the first and second light sources to prioritize luminance output based at least on the temperature of the first light source being a second temperature, greater than the first temperature.

2. The method of claim 1, where the first temperature-dependent luminance change causes a greater loss of luminance output for the first light source than the second temperature-dependent luminance change causes for the second light source as an internal display temperature increases.

3. The method of claim 2, where the second target white point prioritizes luminance output for the first light source.

4. The method of claim 1, where the first light source includes an AlGaInP LED and the second light source includes an InGaN LED.

5. The method of claim 1, where the display further includes a third light source configured to emit light having a third color and having a third temperature-dependent luminance change.

6. The method of claim 5, where the first, second, and third colors include red, green, and blue.

7. The method of claim 1, where setting the second target white point includes setting peak luminance targets for the first light source and the second light source.

8. The method of claim 7, where the peak luminance targets for the first light source and the second light source are retrieved from a lookup table.

9. The method of claim 7, where the peak luminance targets for the first light source and the second light source are set according to a function of the second temperature.

10. The method of claim 1, further comprising measuring an external ambient light, where the second target white point is set according to a function of the external ambient light.

11. The method of claim 1, where the first target white point is a color temperature of 6500K (D65).

12. The method of claim 1, where the second target white point is a color temperature that diverges from a Planckian locus.

13. The method of claim 1, where the first light source and the second light source are lasers.

14. The method of claim 1, where displaying images with the display includes directing the emitted light having the first color and the emitted light having the second color to an eyebox via a near-eye optic of a near-eye display device.

15. A display, comprising:
   a first light source configured to emit light having a first color and having a first temperature-dependent luminance change;
   a second light source configured to emit light having a second color and having a second temperature-dependent luminance change;
   a temperature-measuring device configured to measure a temperature of the first light source; and
   a display controller configured to:
      set a first target white point of images displayed using the first and second light sources to prioritize color accuracy based on the temperature of the first light source being a first temperature; and
      set a second target white point of images displayed using the first and second light sources to prioritize luminance output based at least on the temperature of the first light source being a second temperature, greater than the first temperature.

16. The display of claim 15, where the first temperature-dependent luminance change causes a greater loss of luminance output for the first light source than the second temperature-dependent luminance change causes for the second light source as an internal display temperature increases, and where the second target white point prioritizes luminance output for the first light source.

17. The display of claim 15, further comprising a third light source configured to emit light having a third color and having a third temperature-dependent luminance change, where the first, second, and third colors include red, green, and blue.

18. The display of claim 15, where the second target white point is a color temperature that diverges from a Planckian locus.

19. A near-eye display, comprising:
   a red light source having a red temperature-dependent luminance change;
   a green light source having a green temperature-dependent luminance change less than the red temperature-dependent luminance change;
   a blue light source having a blue temperature-dependent luminance change less than the red temperature-dependent luminance change;
   a temperature-measuring device configured to measure a temperature of the red light source; and
   a display controller configured to:
      set a first target white point of images displayed using the red, green, and blue light sources to prioritize color accuracy based on the temperature of the red light source being a first temperature; and
      set a second target white point of images displayed using the red, green, and blue light sources to prioritize luminance output of the red light source based at least on the temperature of the red light source being a second temperature, greater than the first temperature.

* * * * *